(12) United States Patent
Carapelli (10) Patent No.: US 7,574,377 B2
(45) Date of Patent: Aug. 11, 2009

(54) SYSTEMS, METHODS, AND COMPUTER STORAGE MEDIUM FOR VENDING PRODUCTS AND SERVICES TO PURCHASERS HAVING MOBILE COMMUNICATORS

(76) Inventor: Giovanni Carapelli, Via L. Andreotti, 73, 50142 Firenze (IT)

( * ) Notice: Subject to any disclaimer, the term of this patent is extended or adjusted under 35 U.S.C. 154(b) by 176 days.

(21) Appl. No.: 10/363,060

(22) PCT Filed: Aug. 28, 2001

(86) PCT No.: PCT/IB01/01841

§ 371 (c)(1),
(2), (4) Date: Oct. 9, 2003

(87) PCT Pub. No.: WO02/19279

PCT Pub. Date: Mar. 7, 2002

(65) Prior Publication Data

US 2004/0054601 A1    Mar. 18, 2004

(30) Foreign Application Priority Data

Sep. 1, 2000    (EP) .................................. 00118954

(51) Int. Cl.
*G06Q 30/00* (2006.01)
*G06F 17/30* (2006.01)
(52) U.S. Cl. .......................................... 705/26; 705/27
(58) Field of Classification Search .................. 705/1, 705/26–27; 455/406
See application file for complete search history.

(56) References Cited

U.S. PATENT DOCUMENTS

| 5,717,955 | A | 2/1998 | Swinehart |
| 5,952,638 | A | * 9/1999 | Demers et al. ............... 235/379 |
| 6,098,879 | A | 8/2000 | Terranova |
| 6,259,432 | B1 | 7/2001 | Yamada et al. |
| 6,446,111 | B1 | * 9/2002 | Lowery ...................... 709/203 |
| 6,526,335 | B1 | * 2/2003 | Treyz et al. .................... 701/1 |

(Continued)

FOREIGN PATENT DOCUMENTS

EP      0780802 A    6/1997

(Continued)

OTHER PUBLICATIONS

"Want a Soda? Phone it in mobile commerce could turn your wireless phone into an electronic wallet for all kinds of purchases". Hafner, Katie. The New York Times. SUn Sentinel. Ft. Lauderdale: Mar. 12, 2000 [recovered from Proquest database Jul. 21, 2006].*

(Continued)

*Primary Examiner*—Jeffrey A. Smith
*Assistant Examiner*—William J Allen
(74) *Attorney, Agent, or Firm*—Sterne, Kessler, Goldstein & Fox, PLLC (57) ABSTRACT

The present invention provides a vending system (1) for selling products or services to purchasers having mobile communicators (2) enabled to a wireless internet connection (7), and comprises:—means to permit a customer to communicate to an operator (4), via an internet connection (7), the identity of a vending machine (2);—means by which the operator can authorise via the Internet connection an identified vending machine (2) to make a sale to the purchaser;—means to notify said purchaser via the internet connection.

37 Claims, 7 Drawing Sheets

U.S. PATENT DOCUMENTS

| | | | |
|---|---|---|---|
| 6,535,726 B1 * | 3/2003 | Johnson | 455/406 |
| 6,574,603 B1 * | 6/2003 | Dickson et al. | 705/1 |
| 6,968,365 B2 * | 11/2005 | Hollstrom et al. | 709/217 |
| 7,257,426 B1 * | 8/2007 | Witkowski et al. | 455/569.2 |
| 2002/0032573 A1 * | 3/2002 | Williams et al. | 705/1 |
| 2002/0099608 A1 * | 7/2002 | Pons et al. | 705/21 |
| 2003/0055735 A1 * | 3/2003 | Cameron et al. | 705/26 |
| 2003/0061170 A1 * | 3/2003 | Uzo | 705/64 |
| 2004/0054816 A1 | 3/2004 | Carapelli | |
| 2005/0017068 A1 * | 1/2005 | Zalewski et al. | 235/380 |

FOREIGN PATENT DOCUMENTS

| | | |
|---|---|---|
| EP | 1 024 463 A2 | 8/2000 |
| WO | WO9745814 A | 12/1997 |
| WO | WO9854678 A | 12/1998 |
| WO | WO9922346 A | 5/1999 |
| WO | WO 9941717 A | 8/1999 |
| WO | WO0004476 A | 1/2000 |

OTHER PUBLICATIONS

"Phones used for cashless buys". Kujubu, Laura. Infoworld. San Mateo: Jul. 19, 1999. vol. 21, Iss. 29. p. 16 [recovered from Proquest database Jul. 21, 2006].*

"The Cell Phone: Dial 'M' for Munchies". Ringle, Ken. The Washington Post. Washington, D.C. Jun. 19, 1999 [recovered from Proquest database Jul. 21, 2006].*

Israel: Vending Machine Links With Phone or PC. Jerusalem Post, p. 10, Jul. 4, 1999 [recovered from Dialog on Mar. 26, 2008].*

Move Over E-commerce, Here Comes M-commerce.(mobile commerce)(Brief Article)(Statistical Data Included) The Food Institute Report, vol. 73, p. NA, Mar. 13, 2000 [recovered from Dialog on Mar. 26, 2008].*

Phones used for cashless buys.(TeleVend Vending Automation System Technologies)(Company Business and Marketing) Kujubu, Laura. InfoWorld, vol. 21, No. 29, p. 16, Jul. 19, 1999 [recovered from Dialog on Mar. 26, 2008].*

Net Profits at the Pump?(Brief Article) Reid, Keith. National Petroleum News, vol. 92, No. 1, p. 38, Jan. 2000 [recovered from Dialog on Mar. 26, 2008].*

Patent Abstracts of Japan, vol. 017, No. 031 (M-1356), Jan. 21, 1993 & JP 04253695 A (Sharp Corp), Sep. 9, 1992, abstract.

Patent Abstracts of Japan vol. 1997, No. 01, Jan. 31, 1997 & JP 08249530 A (Sanyo Electric Co Ltd) Sep. 27, 1996, abstract.

Haartsen, J., "Bluetooth—The universal radio interface for ad hoc, wireless connectivity", Ericsson Review No. 3, pp. 110-117, 1998, XP000783249 ISSN: 0014-0171.

The Jini Device Architecture Specification (DA), Jan. 1999, Sun Microsystems, Inc., Version 1.0; pp. 1-7.

The Jini Device Architecture Specification (DA), Jan. 1999, Sun Microsystems, Inc., Version 1.0; pp. 1-11.

Haartsen, J., "The Bluetooth Radio System", IEEE Personal Communications, Feb. 2000, pp. 28-36.

The Jini Lookup Service Specification, Jan. 1999, Sun Microsystems, Inc., Version 1.0, pp. 1-8.

International Search Report issued in Int'l Patent Application No. PCT/IB2001/001853 on Dec. 20, 2001, 3 pages.

International Search Report issued in Int'l Patent Application No. PCT/IB2001/001841 on Jan. 3, 2002, 3 pages.

* cited by examiner

SYSTEMS, METHODS, AND COMPUTER STORAGE MEDIUM FOR VENDING PRODUCTS AND SERVICES TO PURCHASERS HAVING MOBILE COMMUNICATORS

PRIOR APPLICATION DATA

The present application claims the benefit of International Application Ser. No. PCT/IB01/01841, filed Aug. 28, 2001, published as WO 02/19279 on Mar. 7, 2002, entitled "VENDING SYSTEM", which in turn claims the benefit of European Application Serial No. 00118954.7, filed Sep. 1, 2000.

At present several vending systems are already known, in particular the so called "self service" systems by which a purchaser is able to buy a product or a service and to pay by his credit/debit card.

More recently, vending system based on the use of cellular phones have been proposed.

In respect of the previous vending systems, the "cellular" systems presents many advantages due to the fact that cellular phones are used world wide, so that such vending systems can potentially be of interest to a lot of customers.

Unfortunately, with the known systems a customer is not able to "communicate" with the system, in the sense that the cellular link can be utilised by the user only to give instruction without any feedback to the user.

A further disadvantage is that with these systems the customer has to transmit his private data (generally the credit card number) to the vending system.

A still further disadvantage is that the capability of a user to access a cellular based vending system depends on the communication standard used by the cellular phone owned by the customer.

It is thus very difficult for a vending operator to reach all the potential customers (and vice versa) without a lot of difficulties (special agreements with the cellular network providers, specific smart cards) and similar problems.

Furthermore, in the known systems a considerable cost is associated with the user interface which is needed at the vending machines in order to permit the user to properly interact with the system.

An aim of the invention is to provide an improved vending system.

According to the present invention there is provided a vending system for selling products or services to purchasers having mobile communicators enabled to a wireless internet connection, the system comprising:

means to permit a customer to communicate to an operator, via an internet connection, the identity of a vending machine at which he is located;

means by which the operator can authorise via the Internet connection an identified vending machine to make a sale to the purchaser;

means to notify said purchaser via the internet connection.

Employing the present invention enables the client to conduct a transaction with the vending machine he is at, the operator authorising the vending machine and at the same time the customer receives notification that the transaction has been completed.

Preferably said means permitting the customer to communicate to an operator the identity of a vending machine consist of an identifying code of the vending machine at which the purchaser is located and transmitted by the purchaser to a web server of the operator through the internet connection. This permits the unique code associated with the vending machine to be transmitted to the operator. The means permitting the customer to communicate to an operator the identity of the vending machine additionally comprises a first database (DB1) of the operator containing said identifying codes and the corresponding internet addresses (IP) of the vending machines. Provision of the internet address enables the operator to directly contact the vending machine.

Preferably the operator may assign an identity code to the vending machine and change that code at a specified time preferably after each purchase request from a customer. This ensure that a code given by a customer for a transaction will subsequently associate that transaction with that customer. Changing the code will then ensure any further transaction will only be associated with a future customer and not the customer who made the former transaction.

Preferably the web server is located at the vending machine itself but may be located at a position remote from the vending machine, for example at a site controller associated with a number of vending machines in a specific locality.

Advantageously the means to notify the purchaser comprises a database of the operator containing the identity codes of the authorised customers.

The invention is particularly applicable to purchasers having mobile communicators which are connected to the internet through a cellular network. However it is also advantageous that the means for a customer to communicate to an operator the identity of a vending machine comprises a radio frequency interface able to automatically establish a bi-directional communication link between said vending machine and said communicator and to automatically transmit to the customer communicator an identity code when the customer communicator is in the vicinity of the machine. This enables automatic communication to take place without the requirement to use the cellular communication network, and it is particularly advantageous if the interface is able to connect the customer communicator to the internet, this will avoid the customer having to use the cellular network.

Advantageously the system additionally comprises means to permit the customer to transmit via the internet identifying data of a vending machine to an outside authorisation centre and comprises further means permitting outside authorisation centre to transmit to the operator via the internet an authorisation to make a sale.

The system is advantageously employed in a gas station environment where the vending system may be a fuel dispenser or other peripheral device, for example a car wash or point of sale device associated with a quick serve restaurant or similar.

Various embodiments of the present invention will now be described by way of example only with reference to FIGS. 1 to 7 in which like numerals are used to indicate like components and of which.

Figure 1:
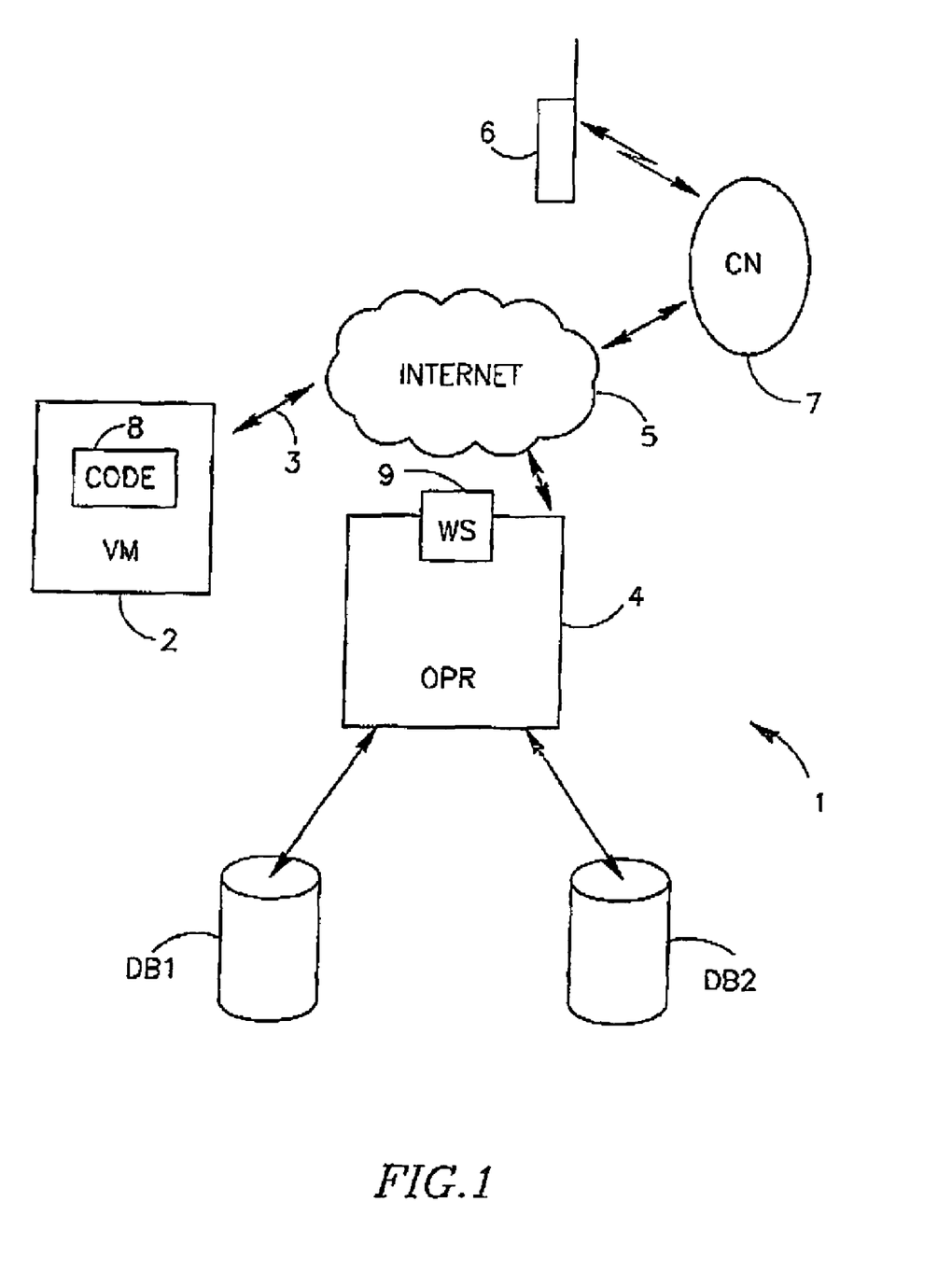
FIG. 1 illustrates a first embodiment where a code is read manually by a customer.

Referring to FIG. 1 a vending system indicated generally as 1 according to the invention comprises:

a vending machine 2, provided with an Internet connection 3;

an internet operator 4 able to communicate via the Internet 5 with the vending machines 2 and with a customer provided with a digital mobile communicator 6. The communicator 6 will typically be a mobile phone but this could be any personal computing device such as a personal digital assistant, provided it has means to connect to and communicate information via a communication link enabled to a wireless bi-directional connection supporting Internet Protocol.

Preferably, the communicator is a WAP (Wireless Application Protocol) enabled cellular phone capable of being connected to the internet by a network access point, for example a digital cellular network 7

The vending machine 2 is provided with a code 8 which the purchaser can read when he is in the vicinity of the vending machine, it being for example present on a display of the vending machine.

A different code is automatically assigned by the internet operator 4 to the machine after each transaction, in order to avoid accidental purchase orders from a customer as can happen in prior art systems where a phone number of the vending machine has to be dialed by the customer to purchase a product or a service.

The operator 4 is provided with a first database DB1 containing identifying data of the vending machines of the system and with a second database DB2 containing identifying data of customers authorised to make a purchase.

The vending machine identifying data comprises vending machine identity numbers ID, codes and the Internet addresses of the vending machines.

The customer data of DB2 comprises customer identity numbers and other account data which can be utilised to authorise a purchase to that customer.

When a purchaser having a suitable communicator 6 is in the vicinity of a vending machine 2 he can read the identifying code 8 corresponding to that machine and connect to the Internet through a network access point 7 in order to communicate with the operator 4 by a web server 9 of the operator, which is preferably an internet "bookmark" on a display of the customer communicator 6.

In this phase, the communicator 6 transmits to the web server 9 a customer ID so that the operator can verify whether the customer is a purchaser already identified in the second database DB2.

Once the purchaser identity has been verified the operator asks the customer to transit the corresponding code 8 of the machine 2.

The operator 4 then receives the code 8 and associates it to the corresponding IP address of the vending machine, both contained in the data base DB1, so that it can check, for example, the functioning state of the vending machine 2 and to authorise the machine to perform a sale.

The vending machine 2 is commanded by the operator 4 to supply the requested product or service and afterwards the purchaser is invoiced for the product or service and a message confirming a successful transaction is displayed on the display of the communicator 6 for example in the form of a SMS message which will act as a receipt of the transaction.

The communication to and from the operator 4 and to and from the communicator 6 are protected by encryption codes (for example SSL) and hence all the connected devices communicate in a secure manner for example through a Public key infrastructure (PKI).

Figure 2:
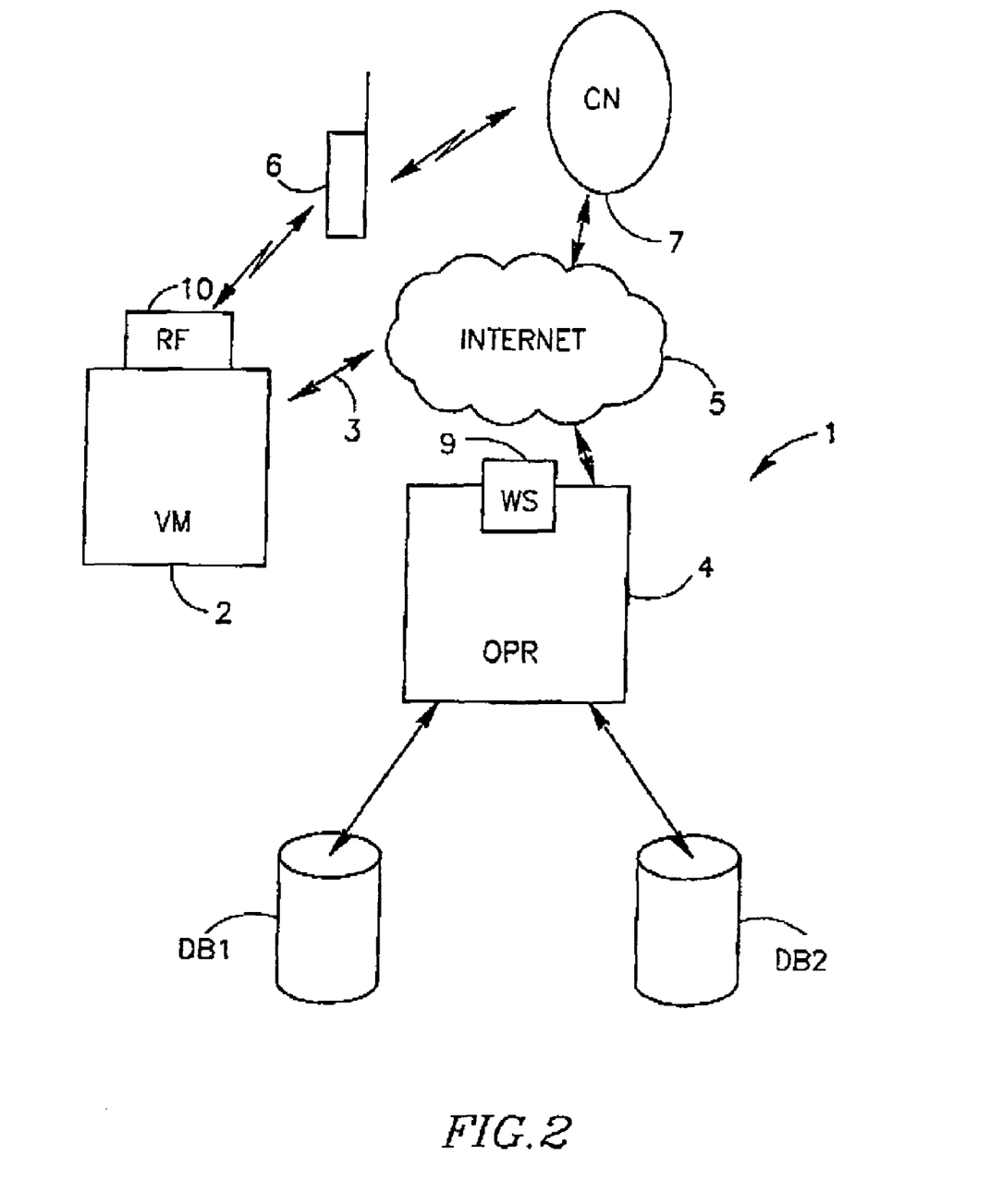
FIG. 2 illustrates a first alternative embodiment employing a radio link between the customer communicator and a vending machine.

FIG. 2 shows a second embodiment of the system, where the vending machine 2 is provided with a bi-directional radio frequency RF interface 10 supporting a communication based on Internet protocol. In this embodiment the wireless connection is able to automatically connect the communicator when the communicator 6 is close to the vending machine 2.

A suitable RF interface is a Bluetooth™ enabled interface and a suitable communicator is a WAP/Bluetooth™ enabled cellular phone.

The RF interface 10 automatically transmits the code 8 to the customer communicator 6. The communicator 6 is then connected through the internet 5 with the web server 9, thus the customer only has to ask for a desired product or service.

As a further advantage, in this case the vending machine does not need a display nor a printer to supply a receipt (given by the system in the form of a SMS message on the user handset) and the user interface is provided completely by the keypad of the communicator 6.

A still further advantage consists in that in this embodiment the vending machine 2 is substantially maintenance-free and is less vulnerable to damage from vandals.

Figure 3:
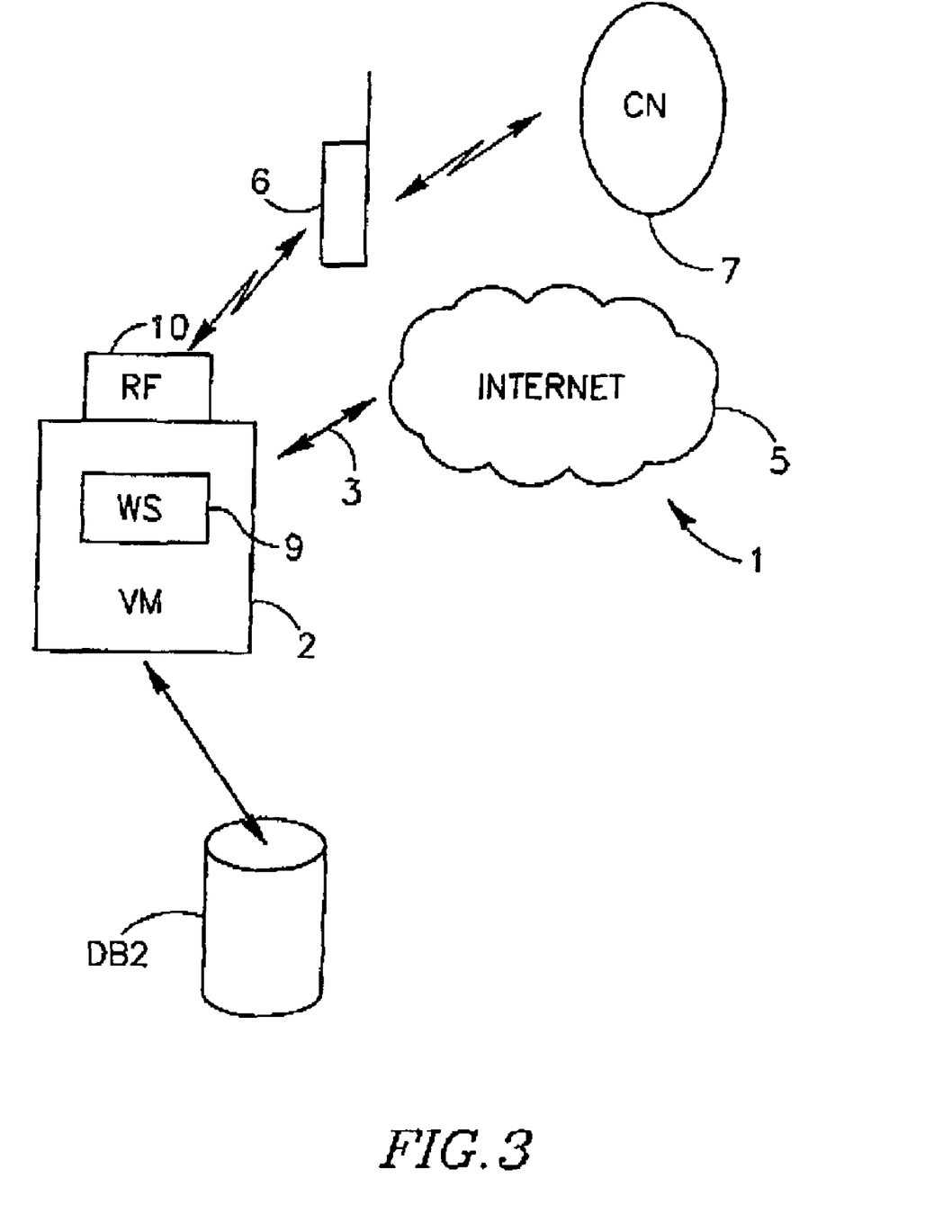
FIG. 3 illustrates a second alternative embodiment where a web server is incorporated into the vending machine.

FIG. 3 shows a further embodiment of the system, where a web server 9 of the operator is located at the vending machine and the customer communicates directly with the vending machine 2, which is provided with the customer database DB2.

Figure 4:
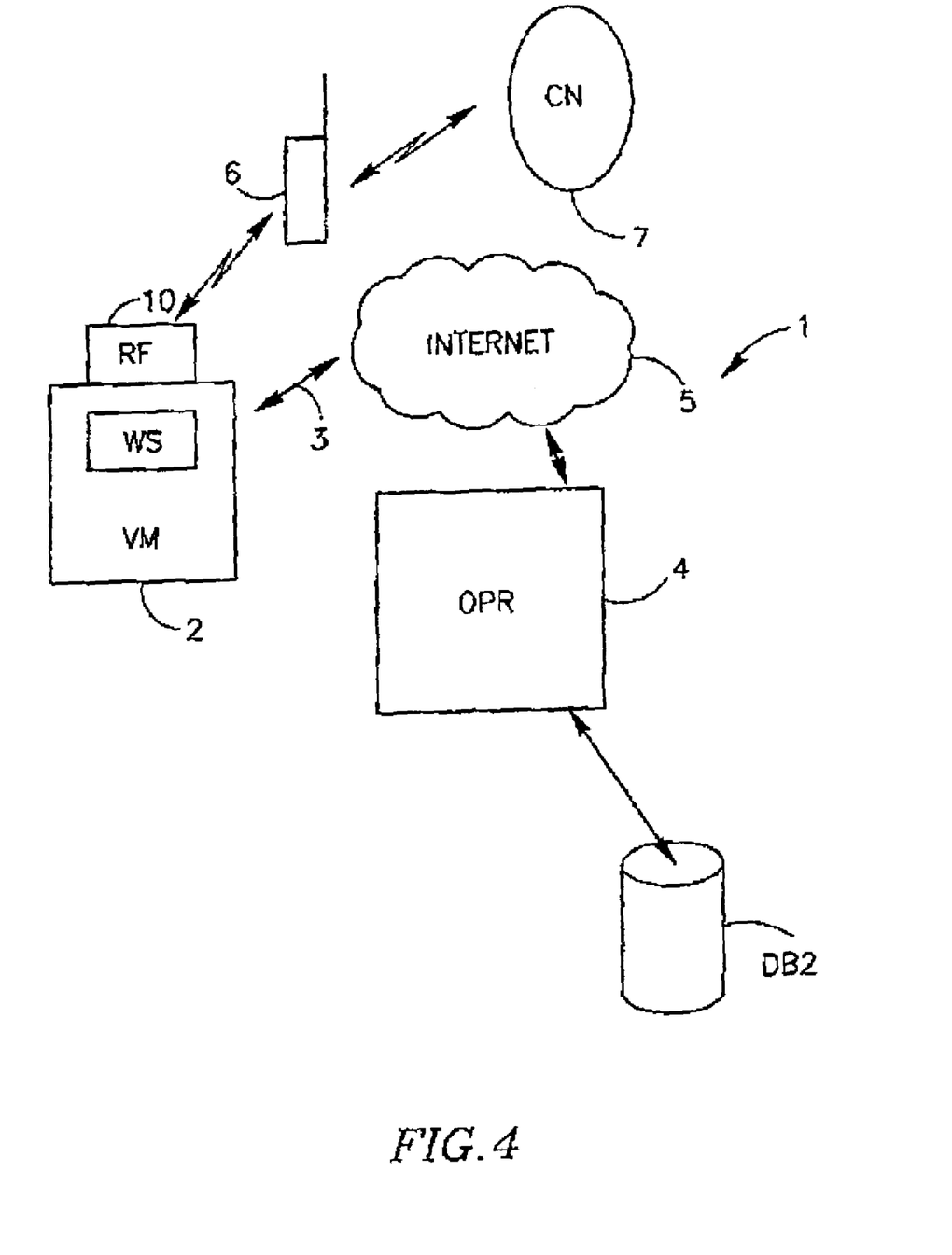
FIG. 4 illustrates a third alternative embodiment where a web server is incorporated into the vending machine.

With this solution there is no need for a remote operator 4 except for billing operations. However as seen in FIG. 4 in the case where a vending chain comprises several vending machines, a data base DB2 and a remote operator 4 will still be required.

Figure 5:
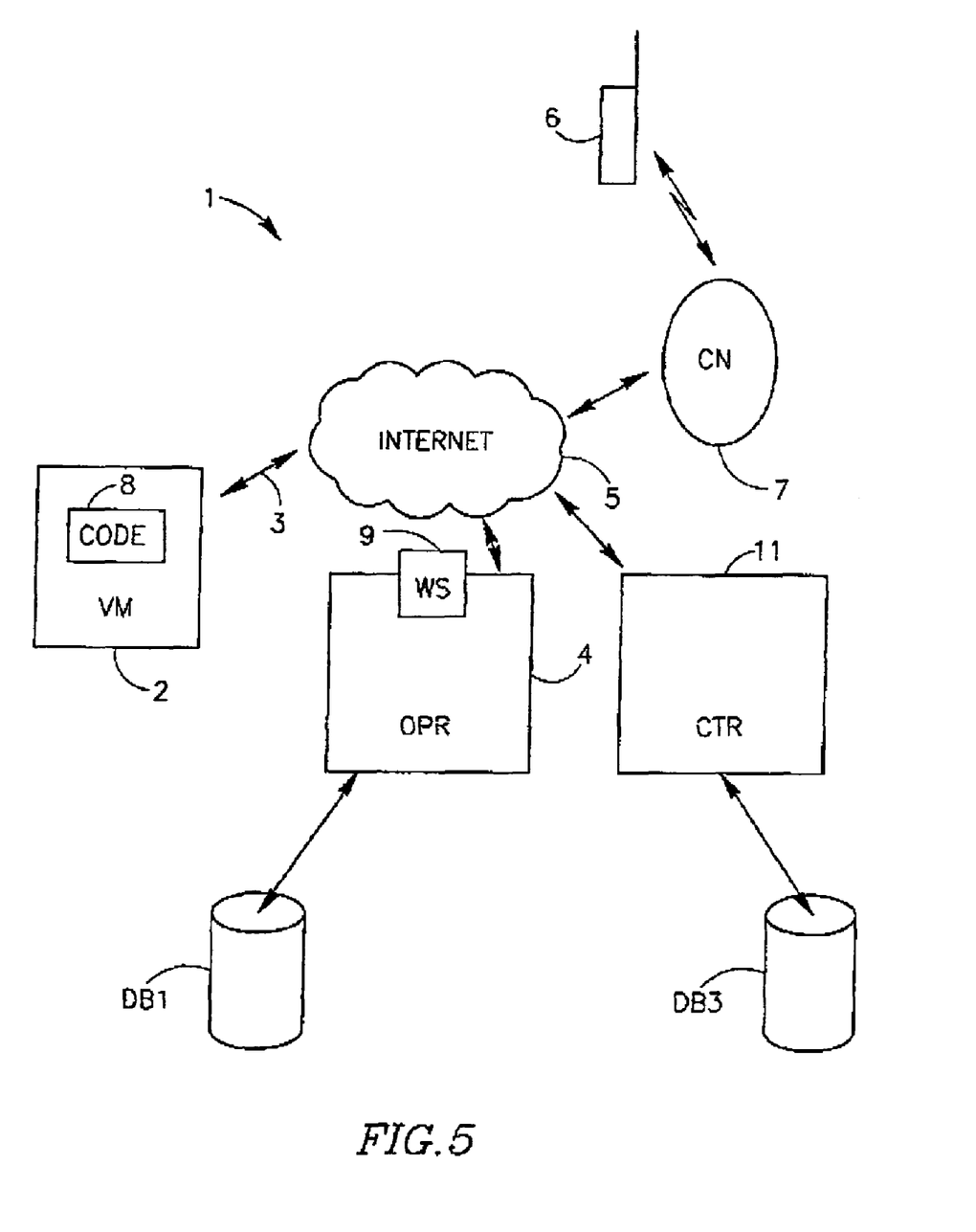
FIG. 5 illustrates a fourth alternative embodiment where the local operator is incorporated into the vending machine.

In FIG. 5 a further embodiment of the invention is shown where the vending system 1 is able to accept the order of any Internet customer accessing the operator 4 and there is no longer the need of the above mentioned customer database DB2.

In FIG. 5 the network access point consists of a cellular network 7 and an outside authorisation centre 11 connected to the operator 4 through the Internet 5, with the authorisation centre provided with a database DB3 containing the identity numbers of the vending machines of the system. According to this embodiment, the user can access the web server 9 of the operator 4 without transmitting his ID to the operator. The web server then asks the user to communicate the code 8 of the vending machine and then sends back to the user an ID and the IP address of the vending machine 2 associated to the code 8. The user is then able to contact the authorisation centre 11 (for example a credit card supplier) transmitting a Personal Identification Number PIN code (for example the credit card number) together with the ID code and the IP address of the vending machine 2. Once a transaction has been authorised the authorisation centre 11, through the internet 5, authorises the operator 4 to command the identified vending machine 2 to supply the requested product or service. Advantageously, in this embodiment the user is guaranteed from possible fraudulent use of his data because the system does not receive any "private" data and the communication between user and authorisation centre can be encrypted by well known protocols (e.g. PPTP Internet protocol or SSL Secure Socket Layer).

Figure 6:
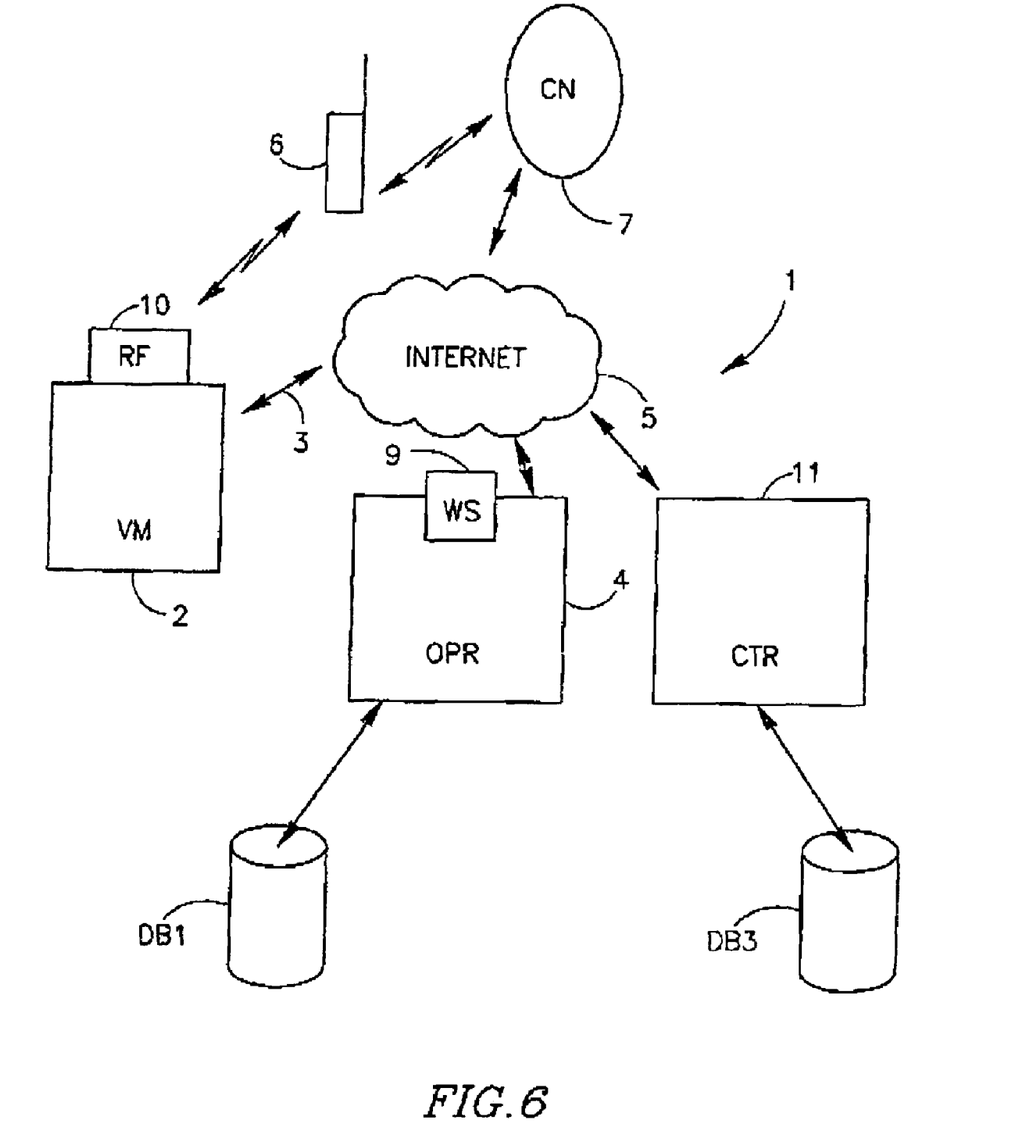
FIG. 6 illustrates a fifth alternative embodiment including a remote authorisation centre.

With reference to FIG. 6 a system is shown which corresponds to the system of FIG. 5 where a bi-directional radio frequency interface 10 of the already discussed type is provided at the vending machine 2.

Figure 7:
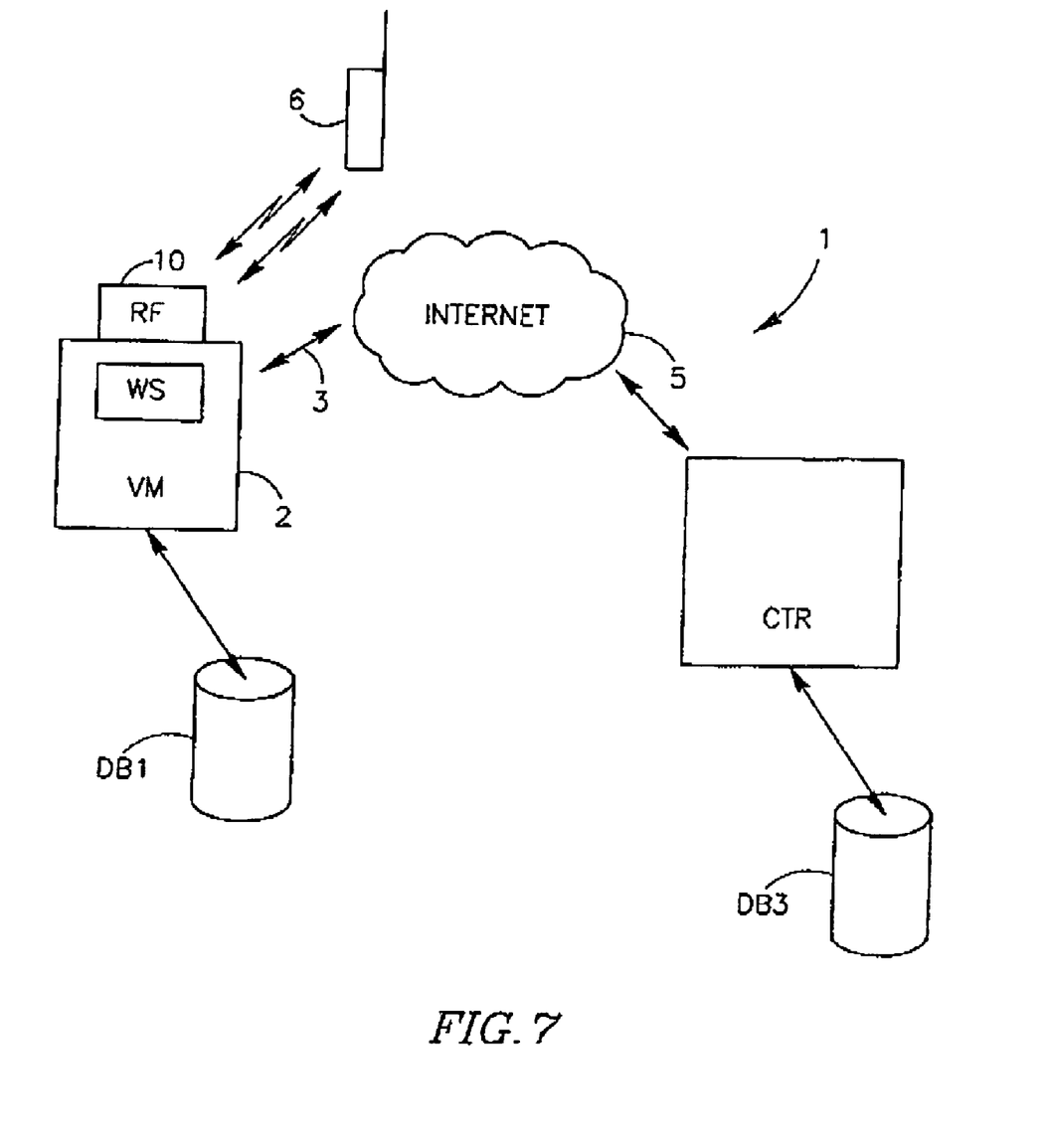
FIG. 7 illustrates a sixth alternative embodiment based on that of FIG. 6.

In FIG. 7 a further embodiment of the system of FIG. 6 is shown, where the network access point NAP consists of the same RF interface 10 of the vending machine 2 connected to the internet 5 through the IN connection 3.

In this case the user accesses the internet "through" the RF interface 10 and connects to the web server of the operator which, in this case, has to be located at the vending machine 2.

In order to guarantee security to the user it is possible to restrict the internet access of the user only to the connection to certain IP addresses (for example a number of authorisation centres) and to encrypt these connections by suitable encryption protocols.

The present invention has been described with reference to preferred embodiments, however, equivalent modifications can be made which will be within the scope of the invention as defined by the appended claims.

The invention claimed is:

1. A vending system for selling products or services to purchasers having mobile communicators configured to communicate with a network by wireless data packet network connection, the system comprising:
   at least one vending machine connected to the network by a network connection;
   an operator server connected to the network by an operator network connection; and
   a mobile communicator connected to the network by a wireless data packet network connection,
   wherein the mobile communicator is configured to (1) transmit via the wireless data packet network connection to the operator server identifying data of a vending machine at which the mobile communicator is located, (2) receive via the wireless data packet network connection vending machine identification information from the operator server, and (3) transmit via the wireless data packet network connection to an external authorization center personal identification information and vending machine identification information, and
   wherein the operator server is configured to (1) receive via the operator network connection communication from the mobile communicator of the identifying data of the vending machine at which the mobile communicator is located, without receiving the personal identification information, (2) transmit via the operator network connection to the mobile communicator vending machine identification information, (3) receive via the operator network connection authorization information from the external authorization center, and (4) authorize the vending machine to supply a good or service.

2. A system according to claim 1, wherein the identifying data of the vending machine at which the mobile communicator is located comprises an identifying code.

3. A system according to claim 2, wherein the operator server further comprises a first database including vending machine identifying codes and the corresponding Internet Protocol (IP) addresses of the vending machines.

4. A system according to claim 2, wherein the operator server is configured to assign an identity code to the vending machine and to change the assigned identity code at a specified time.

5. A system according to claim 4, wherein the operator server is configured to change the assigned identity code after each purchase request from a customer.

6. A system according to claim 1, wherein the operator server is located at said vending machine.

7. A system according to claim 1, wherein the operator server is located at a position remote from said vending machine.

8. A system according to claim 1, wherein the operator server further comprises a second database containing identity codes of authorized customers.

9. A system according to claim 1, wherein said mobile communicator is connected to the Internet through a cellular network.

10. A system according to claim 1, wherein said vending machine further comprises a radio frequency (RF) interface configured to automatically establish a bi-directional communication link between said vending machine and said mobile communicator and to automatically transmit an identity code to the mobile communicator when the mobile communicator is in the vicinity of the vending machine.

11. A system according to claim 10, wherein said RF interface is able to connect the mobile communicator to the Internet.

12. A system according to claim 1, wherein (1) the system comprises the authorization center, (2) the mobile communicator is configured to transmit the vending machine identification information of a vending machine at which the mobile communicator is located to the authorization center, and (3) the external authorization center is configured to transmit authorization information to an operator.

13. A system according to claim 12, further comprising a database associated with the authorization center containing the vending machine identification information.

14. A system according to claim 1, wherein the operator server and the mobile communicator are configured to transmit and receive encrypted data.

15. A system according to claim 1, wherein the system is a gas station system and said vending machine is a fuel dispenser.

16. A vending system according to claim 1, wherein the operator server further is configured to notify the mobile communicator via the operator network connection that a transaction is complete, and the mobile communicator further is configured to receive via the wireless data packet network connection notification from the operator server that a transaction is complete.

17. A vending method for selling products or services to purchasers having mobile communicators configured to communicate with a network by wireless data packet network connection, the method comprising:
   connecting at least one vending machine to the network by a network connection;
   connecting an operator server to the network by an operator network connection;
   connecting a mobile communicator to the network by a wireless data packet network connection,
   configuring the mobile communicator to (1) transmit via the wireless data packet network connection to the operator server identifying data of a vending machine at which the mobile communicator is located, (2) receive via the wireless data packet network connection vending machine identification information from the operator sewer, and (3) transmit via the wireless data packet network connection to an external authorization center personal identification information and vending machine identification information, and
   configuring the operator server to (1) receive via the operator network connection communication from the mobile communicator of the identifying data of the vending machine at which the mobile communicator is located, without receiving the personal identification information, (2) transmit via the operator network connection to the mobile communicator vending machine identification information, (3) receive via the operator network connection authorization information from the external authorization center, and (4) authorize the vending machine to supply a good or service.

18. A method according to claim 17, further comprising providing the identifying data of the vending machine at which the mobile communicator is located as an identifying code.

19. A method according to claim 18, further comprising providing the operator sewer with a first database including vending machine identifying codes and the corresponding Internet Protocol (IP) addresses of the vending machines.

20. A method according to claim 18, further comprising configuring the operator server to assign an identity code to the vending machine and to change the assigned identity code at a specified time.

21. A method according to claim 20, further comprising configuring the operator server to change the assigned identity code after each purchase request from a customer.

22. A method according to claim 17, further comprising locating the operator server at said vending machine.

23. A method according to claim 17, further comprising locating the operator server at a position remote from said vending machine.

24. A method according to claim 17, further comprising providing the operator server with a second database containing identity codes of authorized customers.

25. A method according to claim 17, further comprising connecting said mobile communicator to the Internet through a cellular network.

26. A method according to claim 17, further comprising providing said vending machine with a radio frequency (RF) interface and configuring the RF interface to automatically establish a bi-directional communication link between said vending machine and said mobile communicator and to automatically transmit an identity code to the mobile communicator when the mobile communicator is in the vicinity of the vending machine.

27. A method according to claim 26, further comprising configuring said RF interface to connect the mobile communicator to the Internet.

28. A method according to claim 17, wherein the system includes the authorization center, the method further comprising (1) configuring the mobile communicator to transmit the vending machine identification information of a vending machine at which the mobile communicator is located to the authorization center, and (2) configuring the external authorization center to transmit authorization information to an operator.

29. A method according to claim 28, further comprising providing a database associated with the authorization center containing the vending machine identification information.

30. A method according to claim 17, further comprising configuring the operator server and the mobile communicator to transmit and receive encrypted data.

31. A method according to claim 17, wherein the system is a gas station system and said vending machine is a fuel dispenser.

32. A method according to claim 17, further comprising configuring the operator server to notify the mobile communicator via the operator network connection that a transaction is complete, and configuring the mobile communicator to receive via the wireless data packet network connection notification from the operator server that a transaction is complete.

33. A vending method for selling products or services to purchasers having mobile communicators configured to communicate with a network by wireless data packet network connection, the method comprising:
    connecting at least one vending machine to the network;
    connecting an operator server to the network;
    connecting a mobile communicator to the network by a wireless data packet network connection;
    transmitting from the mobile communicator, via the wireless data packet network connection, to the operator server, identifying data of a vending machine at which the mobile communicator is located, without transmitting personal identification information;
    transmitting from the operator server, via the wireless data packet network connection, to the mobile communicator, vending machine identification information;
    transmitting from the mobile communicator, via the wireless data packet network connection, to an external authorization center, personal identification information and vending machine identification information;
    receiving at the operator server, via the network, authorization information from the external authorization center; and
    transmitting from the operator server to the vending machine authorization to supply a good or service.

34. A method according to claim 33, further comprising:
    transmitting from the operator server, via the network and the wireless data packet network, to the mobile communicator, notification that a transaction is complete.

35. A computer readable storage medium storing program instructions thereon that, when executed by a processor, perform a vending method for selling products or services to purchasers having mobile communicators configured to communicate with a network by wireless data packet network connection, the method comprising:
    connecting at least one vending machine to the network;
    connecting an operator server to the network;
    connecting a mobile communicator to the network by a wireless data packet network connection;
    configuring the mobile communicator to (1) transmit via the wireless data packet network connection to the operator server identifying data of a vending machine at which the mobile communicator is located, (2) receive via the wireless data packet network connection vending machine identification information from the operator server, (3) transmit via the wireless data packet network connection to an external authorization center personal identification information and vending machine identification information, and
    configuring the operator server to (1) receive via the network communication from the mobile communicator of the identifying data of the vending machine at which the mobile communicator is located, without receiving the personal identification information, (2) transmit via the network to the mobile communicator vending machine identification information, (3) receive via the network authorization information from the external authorization center, and (4) authorize the vending machine to supply a good or service.

36. A computer readable storage medium according to claim 35, wherein the method performed by the program instructions further comprises:
    configuring the operation server to notify the mobile communicator via the network that a transaction is complete, and
    configuring the mobile communicator to receive via the wireless data packet network connection notification from the operator server that a transaction is complete.

37. A vending system for selling products or services to purchasers having mobile communicators configured to communicate with a network by wireless data packet network connection, the system comprising:
- at least one vending machine connected to the network;
- an operator server connected to the network;
- a mobile communicator connecting to the network by a wireless data packet network connection;
- the mobile communicator including means for (1) transmitting via the wireless data packet network connection to the operator server identifying data of a vending machine at which the mobile communicator is located, (2) receiving via the wireless data packet network connection vending machine identification information from the operator server, and (3) transmitting via the wireless data packet network connection to an external authorization center personal identification information and vending machine identification information, and
- the operator server including means for (1) receiving via the network communication from the mobile communicator of the identifying data of the vending machine at which the mobile communicator is located, without receiving the personal identification information, (2) transmitting via the network to the mobile communicator vending machine identification information, (3) receiving via the network authorization information from the external authorization center, and (4) authorizing the vending machine to supply a good or service.

* * * * *